United States Patent [19]

Cockfield

[11] Patent Number: 5,779,096
[45] Date of Patent: Jul. 14, 1998

[54] EMERGENCY WINDSHIELD WASHER FLUID RESERVE SYSTEM

[76] Inventor: David E. Cockfield, 325 Shotwell Ct., White Lake, Mich. 48386

[21] Appl. No.: 814,438

[22] Filed: Mar. 10, 1997

[51] Int. Cl.⁶ ............................................. B67D 5/38
[52] U.S. Cl. .................. 222/23; 222/330; 239/284.1; 116/227
[58] Field of Search .................. 222/23, 40, 330, 222/331, 382; 239/74, 284.1; 116/227

[56] References Cited

U.S. PATENT DOCUMENTS

| | | | |
|---|---|---|---|
| 2,673,762 | 3/1954 | Doyle, Jr. | 239/74 |
| 2,914,256 | 11/1959 | O'Sheli . | |
| 4,213,338 | 7/1980 | Hardy | 116/227 |
| 4,331,295 | 5/1982 | Warihashi . | |
| 4,520,961 | 6/1985 | Hueber . | |
| 4,838,488 | 6/1989 | Heier et al. . | |
| 5,000,333 | 3/1991 | Petrelli . | |
| 5,083,339 | 1/1992 | Bristow . | |
| 5,178,091 | 1/1993 | Griller et al. | 222/23 |
| 5,303,845 | 4/1994 | Osawa | 222/23 |
| 5,327,613 | 7/1994 | Ohtsu . | |

*Primary Examiner*—Philippe Derakshani
*Attorney, Agent, or Firm*—Vanophem Meehan & Vanophem, P.C.

[57] ABSTRACT

A windshield wiper washer fluid system designed to visually notify the operator of the vehicle that the windshield wiper washer fluid is getting low and should be refilled. The system includes a tank having a passenger side hose and a driver's side hose each connected thereto such that the passenger side hose only sprays washer fluid on the passenger's side of the windshield and the driver's side hose only sprays washer fluid on the driver's side of the windshield. The tank and hoses are designed such that the passenger's side hose will run out of fluid before the driver's side hose and washer fluid will only spray on the driver's side indicating that the system needs to have washer fluid added while allowing the driver to continue to clean the driver's side of the windshield.

10 Claims, 3 Drawing Sheets

EMERGENCY WINDSHIELD WASHER FLUID RESERVE SYSTEM

BACKGROUND OF THE INVENTION

1. Field of the Invention

The present invention generally relates to a windshield wiper washer system. More specifically the present invention relates to a windshield wiper washer fluid reserve system which notifies the driver that the fluid level is low. Furthermore, the present windshield wiper washer fluid reserve system visually notifies the operator of the vehicle that the washer fluid reservoir is low but yet allows the operator to continue clearing her side of the windshield enabling the driver to refill the reservoir before the washer fluid reservoir is completely empty and the operator must dangerously operate the vehicle.

2. Description of the Prior Art

Almost every car, van, truck and automobile on the road today has some type of windshield wiper system to remove debris in the form of mud, snow, ice, leaves and other items, from the windshield of the vehicle. Some cars even go so far as to provide wiper systems with washer fluid to the car's headlights as disclosed in U.S. Pat. No. 5,083,339 to Bristow.

Despite the significant and lengthy history of the automobile, it remains a problem in current windshield wiper and washing systems that the driver is given inadequate notice of the washer fluid level in the washer fluid reservoir. Thus, the operator of the vehicle must guess or constantly monitor the washer fluid level to refill the washer fluid reservoir prior to the system completely emptying. In which case, a driver must stop and refill the system, possibly in a dangerous location or under undesirable circumstances such as on the side of a highway during rush hour while it is snowing out and visibility is very low. Alternatively, the operator may continue driving under unsafe conditions due to limited visibility because of an inability to clear the windshield.

Many types of windshield wiper and washer fluid systems have been disclosed in an attempt to enhance the quality of the windshield wiper and washer system. Furthermore, some advances have been made which make it easier for the operator to check the washer fluid level through the use of see-through plastic washer fluid reservoirs. However, this system requires the operator to have the vehicle stationary and to lift the hood over the engine compartment.

Further, it is possible to use expensive and intricate, electronic fluid level monitoring systems which are well known in certain arts. These electronic fluid level indicator devices, while not previously combined with a windshield wiper system, do disclose very expensive solutions to the significant problem of indicating the level of washer fluid within the washer fluid reservoir underneath the hood of the engine compartment.

However, few prior art systems exist which specifically disclose a system for warning the driver of the impending depletion of windshield washer fluid. However, some specific alternative designs do exist. U.S. Pat. No. 5,000,333 discloses locating the washer fluid reservoir in the vehicle's wheel well or bumper as opposed to the engine compartment. The '333 reference teaches that relocating the reservoir enables it to be enlarged, freeing up valuable space in the engine compartment and at the same time providing more available washer fluid. The drawbacks to this invention are that the reservoir is not easily accessed for pump repair or replacement, and the added size and quantity of washer fluid add weight to the vehicle.

Other devices have been introduced which use dual tanks or dual spray nozzles to improve the washer fluid system. For example, U.S. Pat. No. 2,914,256 discloses the use of two containers for holding a concentrated detergent in one container, and a milder rinsing agent in a second container. Likewise U.S. Pat. No. 4,331,295 to Warihashi and U.S. Pat. No. 5,327,613 to Ohtsu disclose dual tank arrangements for housing a strong detergent in one and a rinsing agent in the other.

Dual nozzle arrangements are disclosed in U.S. Pat. No. 4,520,961 to Hueber and U.S. Pat. No. 4,838,488 to Heier et al. Hueber discloses multiple jets whose inclinations vary according to the vehicle's speed to optimize the angle that the washer fluid is sprayed onto the windshield. Heier et al. disclose a device that sends washer fluid from a common source to both the front and rear windshields of a vehicle.

Nowhere does the prior art address the need for a system that adequately warns the driver of an impending shortage of washer fluid. What is needed is a windshield washer fluid reserve system that warns the driver of a low washer fluid level while allowing the driver to continue clearing the windshield to allow for safe driving without having to immediately pull over and refill the washer fluid reservoir. The present invention provides a driver with an indication that the washer fluid level is low and needs attending with enough advance warning to avoid running out of fluid completely before having a chance to refill the reservoir. The adequate advance warning extends the safe driving length of a tank of washer fluid. Furthermore, there continues to be a significant need to provide such a device at a relatively very inexpensive cost to allow for incorporation into every automobile on the road.

SUMMARY OF THE INVENTION

The present invention includes a washer fluid reservoir having two separate lines that supply washer fluid separately to the passenger side and driver side of a windshield. The tank or washer fluid reservoir is designed to hold an amount of reserve fluid to allow the driver enough time to stop and refill the reservoir before completely running out of fluid. The passenger side supply line or hose is located within the tank at a point above where the driver supply line is located so that the washer fluid being sent to the passenger side runs out or stops being sent and the fluid continues to be sent to the driver's side of the windshield. The absence of washer fluid on the passenger side provides a visual indication to the driver that the washer fluid level is getting low. The reserve amount of washer fluid allows the driver to continue to receive washer fluid for a limited time after the passenger supply has ended until the washer fluid reservoir can be refilled. This eliminates the problem with prior art reservoirs which only have a single hose from the reservoir which is split, after the pump, into a passenger side hose and an operator side hose.

Additionally, the present invention includes alternative embodiments which provide the same feature, i.e. a visual indication to the driver of the vehicle that the amount of washer fluid is getting low. The alternatives include differing means for attaching the hoses to the fluid reservoir and separate operator side and passenger side fluid reservoir tanks.

Accordingly, it is an object of the present invention to provide a driver with adequate warning that the amount of washer fluid is getting low and should be replenished.

It is a further object of the present invention to supply washer fluid to the driver's side of the windshield corresponding to the driver's side windshield wiper for a longer period of time than washer fluid is supplied to the passenger's side of the windshield to provide a visual indication to the driver that the fluid reservoir needs refilling.

It is yet another object of the present invention to locate the end of the driver side supply line at a position within the washer fluid reservoir where it will continue to have access and supply washer fluid after the passenger supply line no longer has access to and ceases supplying washer fluid to the passenger side of the windshield.

DETAILED DESCRIPTION OF THE PREFERRED EMBODIMENT

Figure 1:
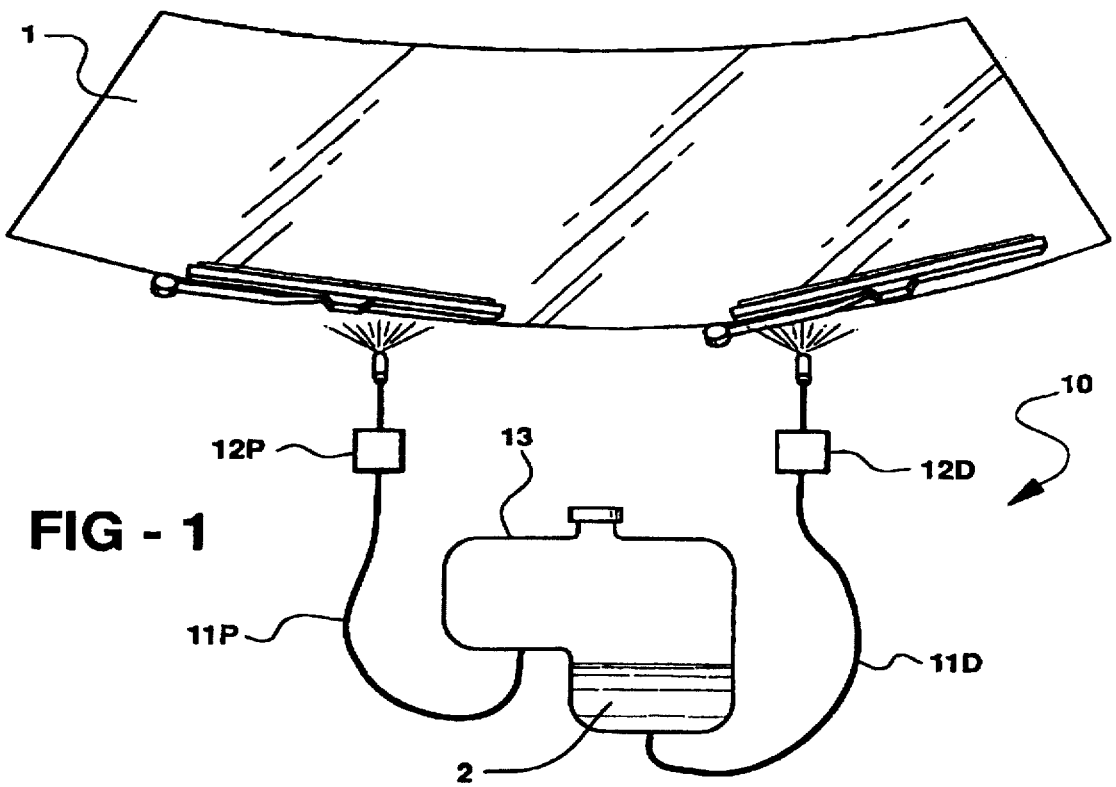
FIG. 1 is a schematic of one embodiment of the washer fluid reservoir system of the present invention that utilizes a single tank two supply lines, and a separate pump for each supply line.

Referring to FIG. 1 a schematic of an embodiment of a washer fluid reservoir system 10 of the present invention is shown. FIG. 1 shows a washer fluid reservoir or tank 13 for retaining a supply of washer fluid 2 to be used to clean a windshield 1. A passenger side supply line 11P is connected to the tank 13 so as to provide a passageway for the washer fluid 2 to travel from the reservoir 13 to the passenger's side of the windshield 1. A driver's side supply line 11D provides a passageway for the washer fluid 2 to travel from the reservoir 13 to the driver's side of the windshield 1.

Figure 2:
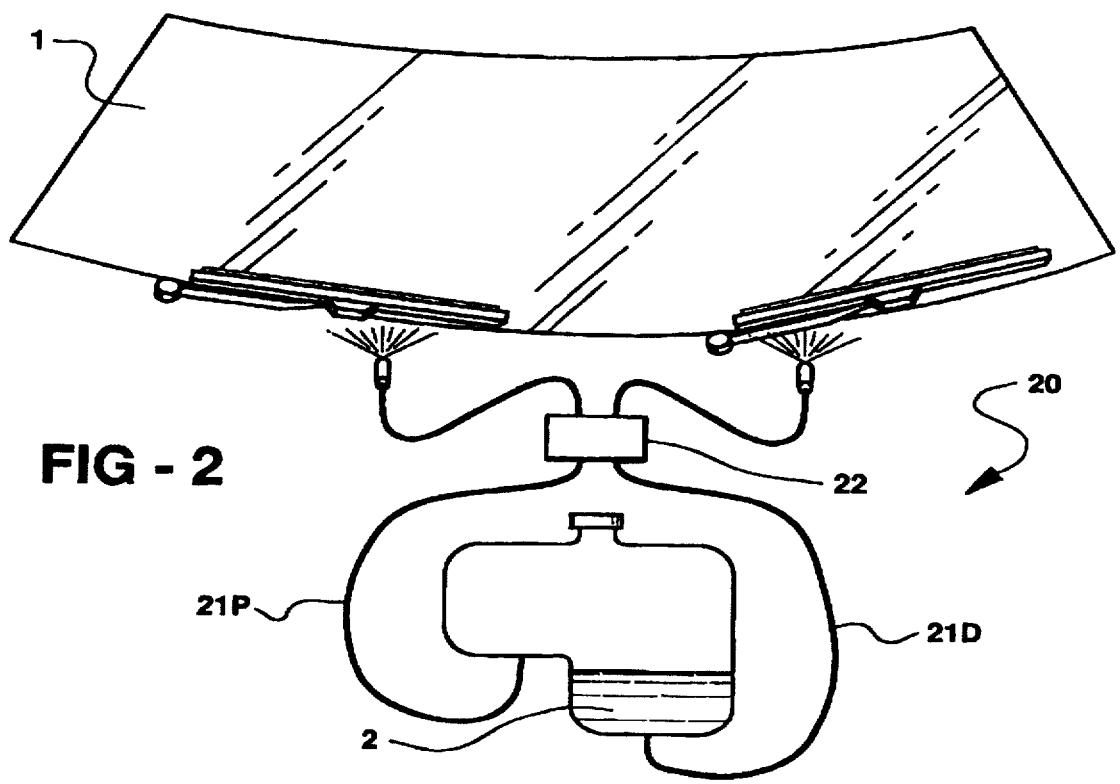
FIG. 2 is a schematic of another embodiment of the washer fluid reservoir system of the present invention that utilizes a single pump for both supply lines.

A pump is used to suction the washer fluid 2 from the reservoir 13 and direct it through the supply lines 11P and 11D to the windshield 1. In one embodiment of the present invention 20 a single pump 22 can be used to supply both lines 21P and 21D as shown in FIG. 2. FIG. 1 shows an embodiment of the present invention 10 that utilizes a pump 12P and 12D for each supply line 11P and 11D. The two separate pumps 12P and 12D operate simultaneously to direct washer fluid 2 to the windshield 1. It should be noted that any embodiment of the present invention can be adapted to use either a single pump 22, or dual pumps 12P and 12D.

The passenger side supply line 11P should be located at a point on the reservoir tank 13 that is higher than the connection point of the driver side supply line 11D. This is important in that it is critical that the supply of washer fluid 2 to the passenger side run out before the driver side supply. The absence of washer fluid 2 on the passenger side of the windshield 1 notifies the driver that the washer fluid 2 level is getting low and should be refilled. The tank 13 has an adequate supply of washer fluid 2 to enable the washer fluid reservoir system 10 of the present invention to continue to supply washer fluid 2 to the driver's side for a limited period of time. This ensures the driver has adequate fluid 2 to continue to clean the windshield 1 and provide an unobstructed view until the reservoir tank 13 can be refilled.

There are unlimited possibilities in which to maintain a washer fluid 2 supply to the driver's side for a longer period of time than a supply to the passenger side. Some of the possible configurations are described in detail below.

One embodiment 10 as shown in FIG. 1 shows a unique tank shape 13 which is lower on the driver's side. Both the passenger side supply line 11P and the driver side supply line 11D are located in the bottom of the tank 13. Because the bottom of the tank 13 on the driver's side is lower than the bottom of the tank 13 on the passenger side, a reserve amount of washer fluid 2 collects on the driver's side. Once the fluid 2 level in the tank 13 goes below the access point of the passenger side supply line 11P, fluid 2 is no longer directed to the passenger side of the windshield 1, and the pump 11P begins to pump only air to passenger side. The lack of washer fluid 2 on the passenger side gives the driver notice that the reservoir tank 13 is getting low and needs to be refilled. In the meantime, the reserve amount of washer fluid 2 in the lower portion of the tank 13 continues to be pumped to the windshield 1 maintaining a clear, unobstructed view tor the driver.

Figure 3:
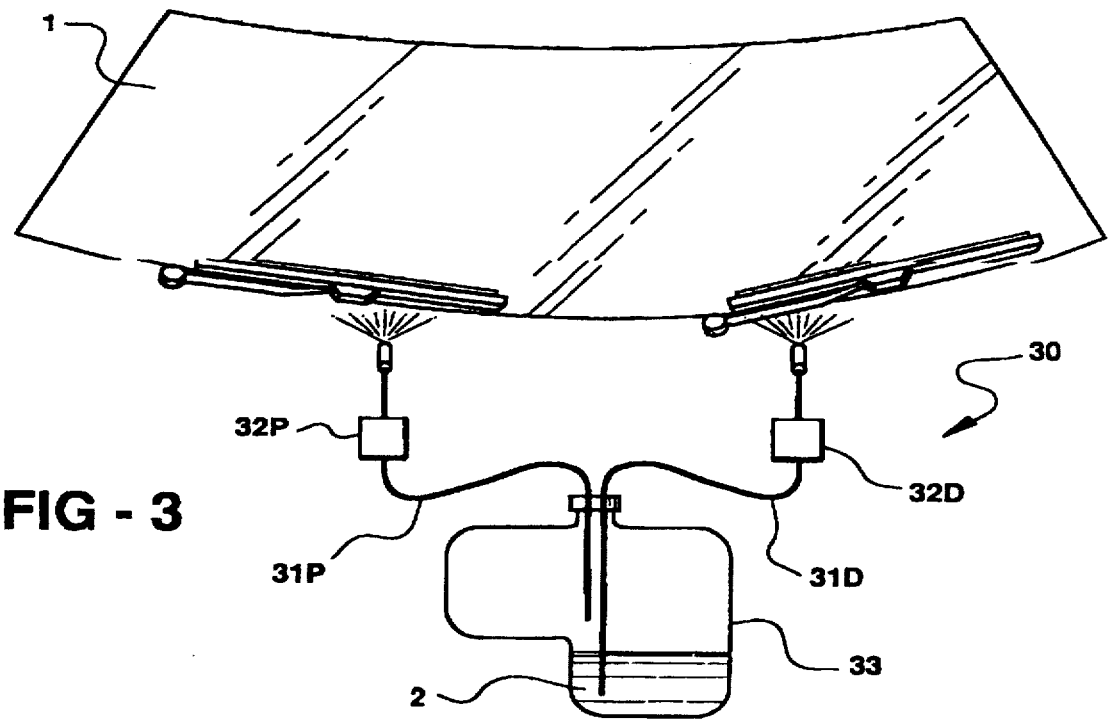
FIG. 3 is a schematic of an embodiment of the arrangement of the passenger supply line relative to the driver supply line.

In another embodiment 30 of the present invention, as shown in FIG. 3, the passenger side 31P and the driver side 31D supply lines enter through the top of the reservoir tank 33 and extend to a point near the bottom of the tank 33. It is important that the passenger side supply line 31P stop short of the end of the driver side supply line 31D. Therefore, the fluid 2 supply to the passenger side runs out prior to the fluid 2 supply to the driver's side.

Figure 4:
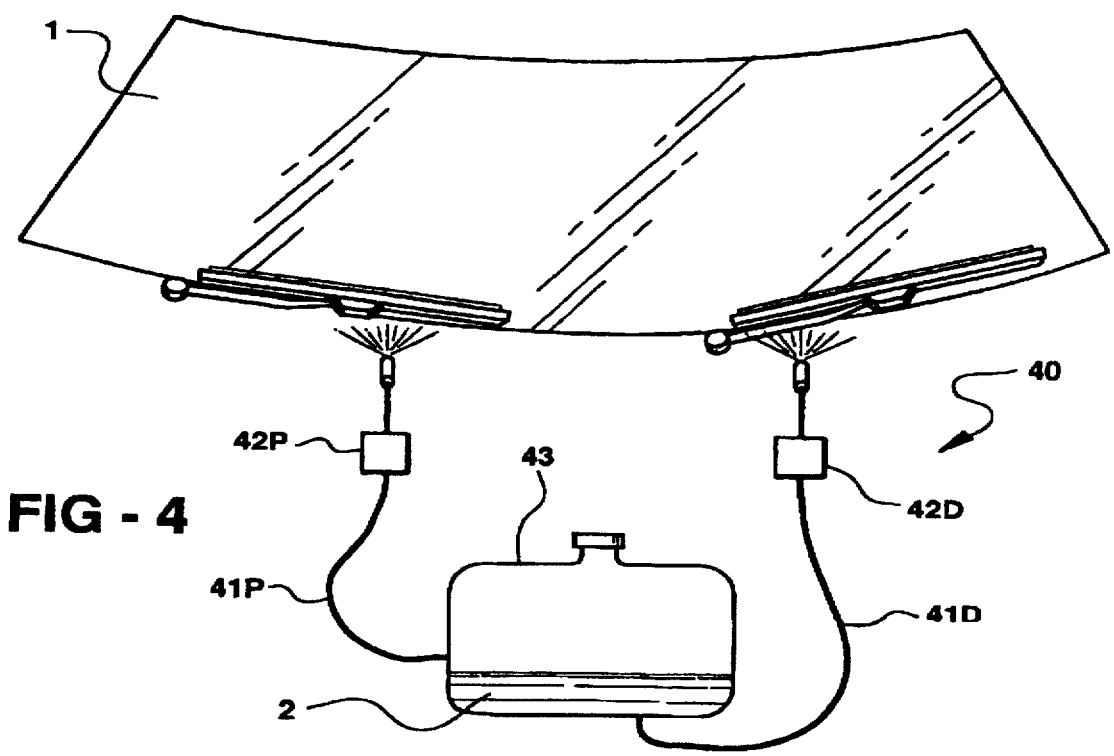
FIG. 4 is a schematic of another embodiment of the arrangement of the passenger supply line relative to the driver supply line.

In yet another embodiment 40 shown in FIG. 4 the passenger side supply line 41P is attached to a side of the reservoir tank 43 at a point just above the tank's 43 bottom. The driver side supply line 41D is attached to the very bottom of the tank 43. This embodiment 40 allows a more uniform shape for the tank 43, and still allows the lack of fluid 2 to the passenger side to act as an indicator to the driver that the fluid 2 level needs attending.

Figure 5:
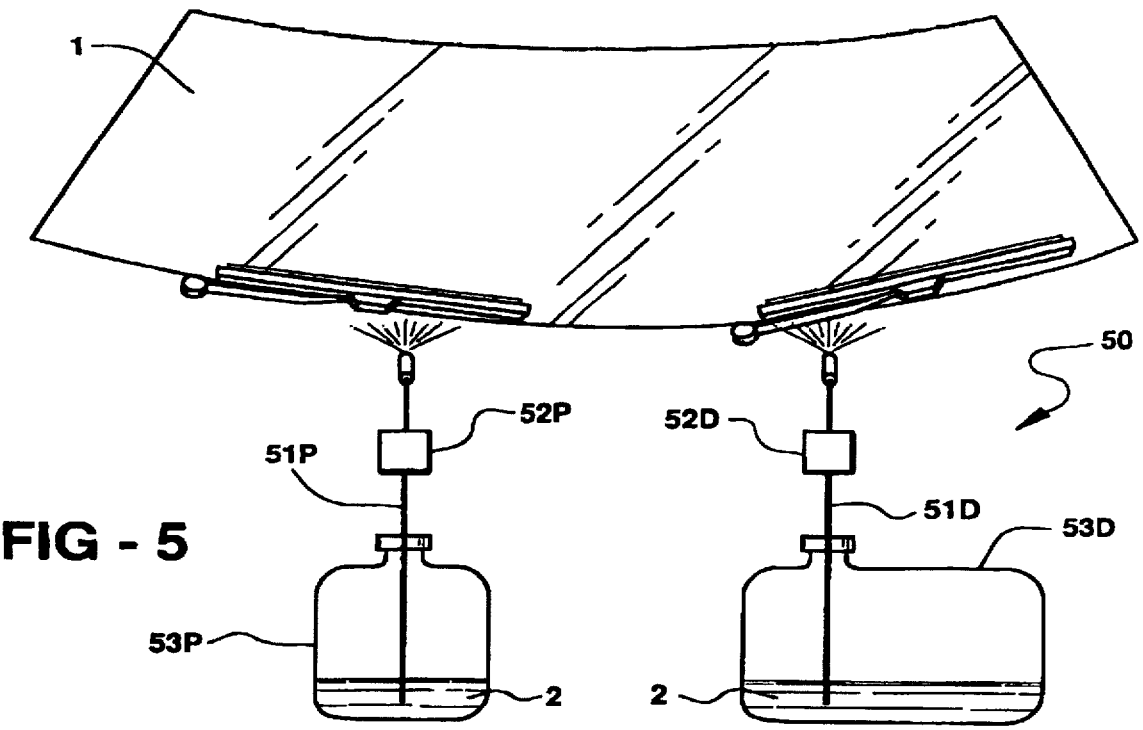
FIG. 5 is a schematic of an embodiment of the washer fluid reservoir system of the present invention that utilizes separate operator side and passenger side tanks, wherein the passenger side supply tank is smaller in size than the driver side supply tank.
Figure 6:
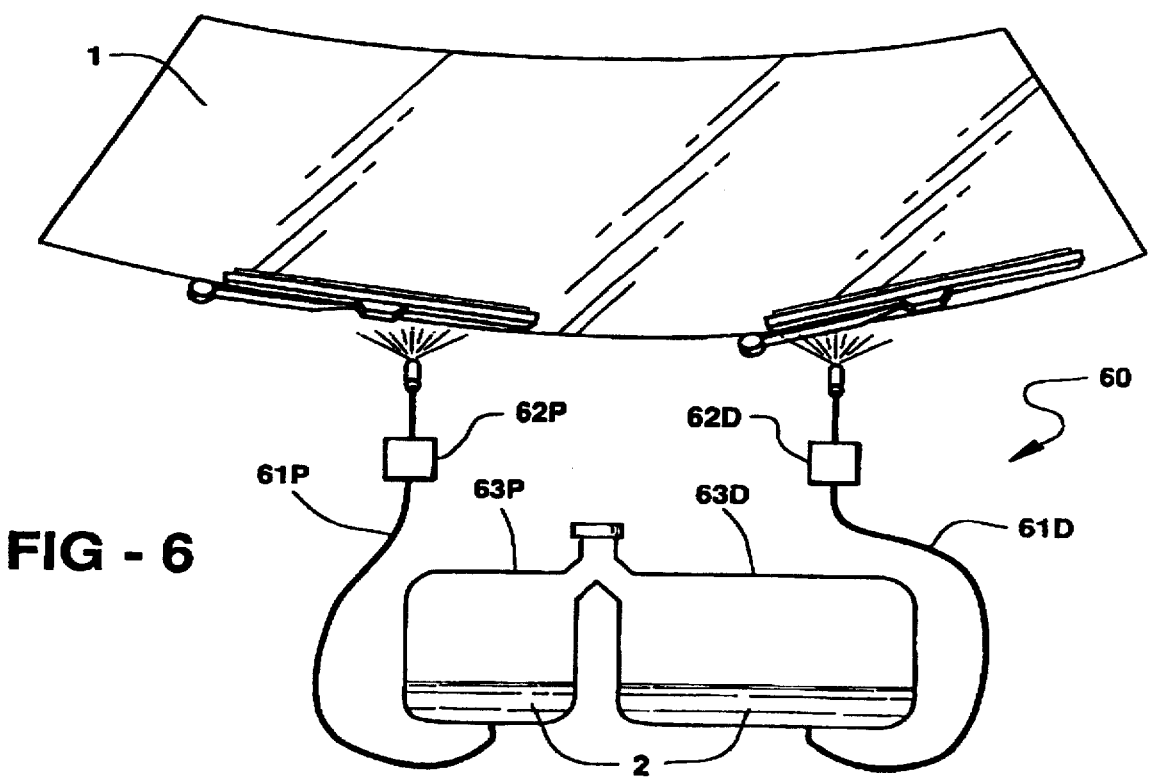
FIG. 6 is a schematic of an embodiment of the washer fluid reservoir system of the present invention in which the tank has two separate compartments and a single fill spout, wherein the passenger side supply compartment is smaller in size than the driver side supply compartment.

In yet other embodiments 50 and 60, the tank itself is divided into two segments. The tank can be two separate tanks 53P and 53D as shown in FIG. 5, or a single tank 63 with separate compartments as shown in FIG. 6, a passenger side compartment 63P and a driver side compartment 63D. In either embodiment 50 or 60, it is critical that the passenger side tank 53P, 63P be smaller in size than the driver side tank 53D, 63D. The passenger side tank 53P, 63P will run out of fluid 2 before the driver side tank 53D, 63D, and as in the other embodiments, the lack of washer fluid 2 indicates to the driver that the fluid in the driver side tank 53D, 63D needs to be refilled.

The invention provides a simple, cost effective means for indicating low fluid level to a driver, while maintaining enough fluid to retain a clear, unobstructed view for the driver.

The invention is not limited to the embodiments described and shown in the accompanying drawings. Modifications are possible, particularly with respect to the tank shape and supply line configurations. For example, it is possible to provide an indicator light which is activated by the passenger side supply pump that lights up when the passenger side pump begins to suction only air. The present embodiments are to be considered illustrative and not restrictive when taken in conjunction with the appended claims.

What is claimed is:

1. A windshield wiper washer fluid system for use in cleaning debris from a windshield of an automobile, said windshield being generally divided into an operator side and a passenger side, said system comprising:

a washer fluid reservoir having a top and a bottom, said washer fluid reservoir located on said vehicle for holding said washer fluid;

an operator side hose having a first end connected to said washer fluid reservoir at a first point;

a passenger side hose having a first end connected to said washer fluid reservoir at a second point, said second point located closer to said top of said washer fluid reservoir than said first point where said operator side hose is connected to said washer fluid reservoir;

means for moving said washer fluid from said washer fluid reservoir through said operator side hose and said passenger side hose, said moving means in communication with said operator side hose and said passenger side hose; and wherein said operator side hose has a second end located such that said washer fluid moving from said operator side hose locates on said operator side of said windshield and said passenger side hose has a second end located such that said washer fluid moving from said passenger side hose locates on said passenger side of said windshield.

2. The windshield wiper washer fluid system according to claim 1 wherein said moving means comprises a pump, said system further comprising a motor connected to said pump for operating said pump and a switch located in said vehicle and operated by said operator, said switch operating said motor and said pump.

3. A windshield wiper washer fluid system for use in cleaning debris from a windshield of an automobile, said windshield being generally divided into an operator side and a passenger side, said system comprising:

an operator washer fluid reservoir having a first predefined volume, said washer fluid reservoir located on said vehicle for holding said washer fluid;

a passenger washer fluid reservoir having a second predefined volume, wherein said first predefined volume of said operator washer fluid reservoir is larger than said second predefined volume of said passenger washer fluid reservoir;

an operator side hose having a first end connected to said operator washer fluid reservoir;

a passenger side hose having a first end connected to said passenger washer fluid reservoir;

first means for moving washer fluid from said operator washer fluid reservoir through said operator side hose, said first moving means in communication with said operator side hose;

second means for moving washer fluid from said passenger washer fluid reservoir through said passenger side hose, said second moving means in communication with said passenger side hose; and wherein said operator side hose has a second end located such that said washer fluid moving from said operator washer fluid reservoir locates on said operator side of said windshield and said passenger side hose has a second end located such that said washer fluid moving from said passenger washer fluid reservoir locates on said passenger side of said windshield.

4. The system according to claim 3 wherein said first and said second moving means move said washer fluid from said operator washer fluid reservoir and said passenger washer fluid reservoir at the same rate during the same intervals of time.

5. A washer fluid reservoir system for dispensing washer fluid onto a vehicle's windshield, said washer fluid reservoir comprising:

a tank;

a first supply line having a first end and a second end, said first end of said first supply line attached to said tank;

a second supply line having a first end and a second end, said first end of said second supply line attached to said tank at a point above said first supply line wherein said first supply line retains access to said washer fluid within said tank for a longer period of time than said second supply line, providing notice that said washer fluid in said tank is getting low; and means for pumping said washer fluid from said tank through said first and second supply lines to said windshield.

6. A washer fluid reservoir system as claimed in claim 5 wherein said means for pumping said washer fluid further comprises:

a first pump attached to said second end of said first supply line;

a second pump attached to said second end of said second supply line, wherein said first and second pumps pump said washer fluid from said tank to said windshield, said first pump pumps washer fluid for a longer period of time than said second pump pumps washer fluid providing notice that said washer fluid in said tank is getting low.

7. A washer fluid reservoir system as claimed in claim 5 wherein said means for pumping washer fluid further comprises a single pump attached to said second end of said first supply line and said single pump attached to said second end of said second supply line.

8. A washer fluid reservoir system as claimed in claim 5 wherein said tank further comprises a reserve portion wherein said first end of said first supply line is attached to said reserve portion so that said first supply line retains access to washer fluid for a longer period of time than said second supply line providing notice that said washer fluid within said tank is getting low.

9. A washer fluid reservoir system as claimed in claim 5 wherein said tank further comprises two tanks, said first tank being larger in size than said second tank, said first supply line attached to said first tank, said second supply line attached to said second tank, said first supply line retaining access to washer fluid for a longer period of time than said second supply line providing notice that said washer fluid within said tank is getting low.

10. A washer fluid reservoir system as claimed in claim 5 wherein said tank further comprises a tank having first and second reservoirs and one access opening, said first reservoir being larger in size than said second reservoir, said first end of said first supply line attached to said first reservoir, said first end of said second supply line attached to said second reservoir, said first reservoir retaining access to washer fluid for a longer period of time than said second supply line providing notice that said washer fluid within said tank is getting low.

* * * * *

UNITED STATES PATENT AND TRADEMARK OFFICE
CERTIFICATE OF CORRECTION

PATENT NO.   : 5,779,096
DATED        : July 14, 1998
INVENTOR(S)  : David E. Cockfield It is certified that error appears in the above-identified patent and that said Letters Patent is hereby corrected as shown below:

Column 1, line 22, after "snow" kindly delete the period "." and insert a comma ---,---.

Column 3, line 17, after "tank" kindly insert "a comma" ---,---.

Column 4, line 27, kindly delete "tor" and insert ---for---.

Signed and Sealed this

Fifth Day of January, 1999

Attest:

Attesting Officer

*Acting Commissioner of Patents and Trademarks*